Sept. 15, 1942.    T. S. SAFFORD    2,295,758
BRAKE ADJUSTER
Filed May 12, 1941
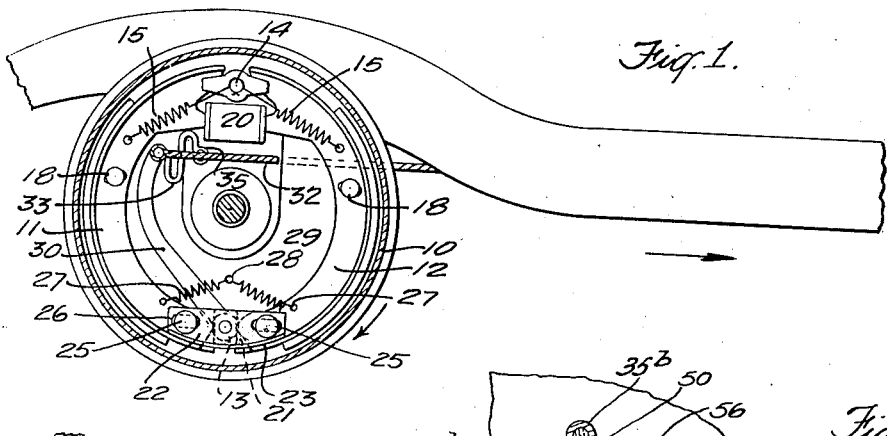
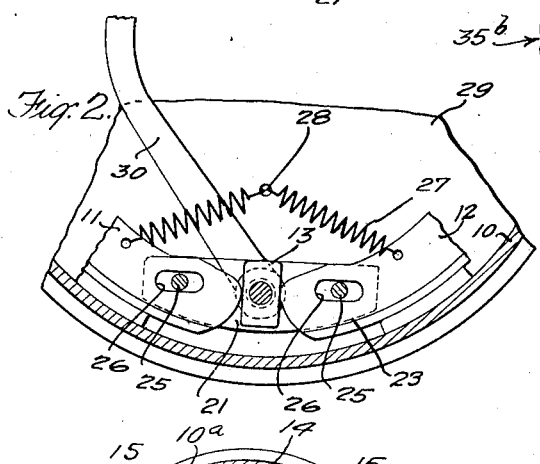
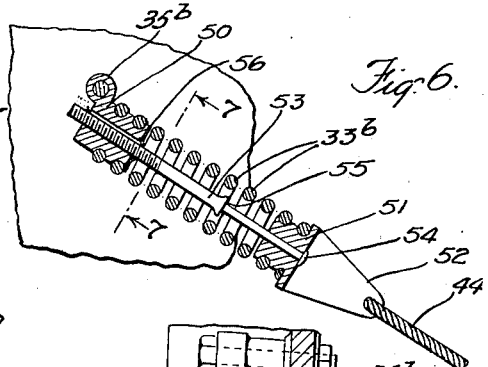
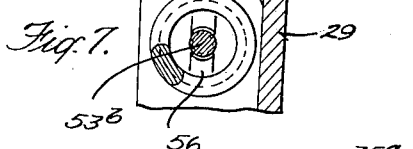
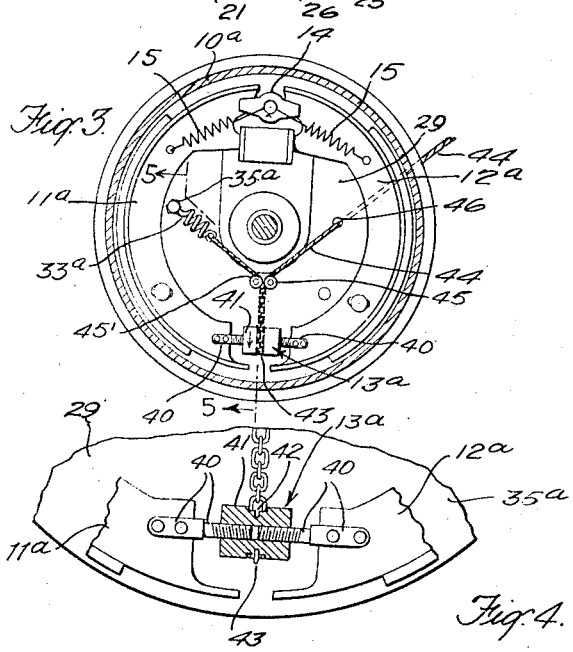
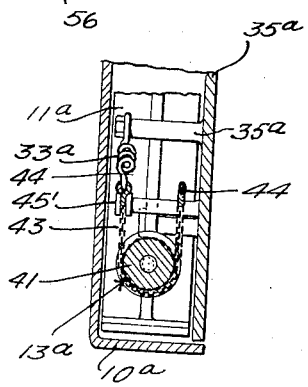
INVENTOR
TRUMAN S. SAFFORD.
BY
ATTORNEYS Patented Sept. 15, 1942

2,295,758

UNITED STATES PATENT OFFICE 2,295,758

BRAKE ADJUSTER

Truman S. Safford, Riverside, Conn.

Application May 12, 1941, Serial No. 393,068

6 Claims. (Cl. 188—79.5)

This invention relates to braking devices for stopping or preventing rotary motion and more particularly to devices for automatically adjusting brakes to compensate for wear.

In a prior Patent No. 2,196,396, dated April 9, 1940, of George S. Lane, there is disclosed a type of adjusting device which operates to maintain a predetermined clearance regardless of wear by reason of its own limited elastic stretch or compression and its mounting in a device which is to be adjusted so that it reaches its elastic limit at the position of full operation, assuring the predetermined clearance by its own elastic retraction from such position of full operation.

It is one object of my present invention to improve and extend the utilization of such devices in braking systems such for example as those now used in standard equipment on automobiles manufactured by the G. M. Corp., but my invention is not limited to the use of the said Lane devices.

Brakes of the type mentioned are now composed of two approximately semi-circular shoes, abutting at their upper ends against a fixed anchor secured on a frame or backing plate and joined at their lower ends by a turnbuckle which serves as an adjustment to expand the ring composed of the two shoes and turnbuckle, to compensate for wear at the surface of the shoes. This device requires a rather difficult manual adjustment at frequent intervals which must be made by an expert in an automotive repair shop. Such brakes are ordinarily provided with a hydraulic motor system energized from a pedal pump to drive the shoes apart at the upper ends and are ordinarily provided also with a mechanically operated mechanism engaging the shoes beside the hydraulic motor for similarly separating the shoes to serve as an emergency and parking brake.

Another object of my invention is to eliminate the necessity for the manually operated turnbuckle or other manual adjustment in such a system and to substitute a mechanism which will automatically adjust the brakes from time to time as an incident of normal use.

Another object of my invention is to simplify the structure of a brake by combining functions of certain parts and eliminating others.

Another object of my invention is to provide a simple and absolutely reliable brake structure which will be kept in proper adjustment by simple operations available to the operator without the use of tools and without need to understand the principles of construction, adjustment or repair of the brakes.

Other objects and advantages of my invention will be apparent to those skilled in the art from the following description and the accompanying drawing.

In the accompanying drawing, I have shown, and in the specification shall describe, a preferred embodiment of my invention by which these objects are attained, and various modifications and alternatives thereof. In selecting and presenting this drawing and the various modifications suggested in this application, it should be understood that they are not intended to be exhaustive nor limiting of the invention, but on the contrary that they are given with a view to illustrating the invention and explaining the principles thereof and the best manner of embodying the same in use in order that others may fully understand the same and may be enabled to embody the invention in numerous other forms and with numerous other modifications, each as may be best adapted to conditions of their particular use.

Referring to this drawing:

Fig. 1 is a fragmentary view partly in vertical section taken inside the wheel, and partly in elevation, showing a portion of the frame of an automobile with the wheel and portions of the axle and brake drum cut away to expose the brake mechanism;

Fig. 2 is a fragmentary view enlarged showing a portion at the bottom of Fig. 1, on a section taken along the outer face of the web of the brake shoe;

Fig. 3 is a view in elevation of another brake mechanism embodying a different form of my invention;

Fig. 4 is a sectional view taken on a plane similar to that of Fig. 2, but showing a portion of the structure shown at the bottom of Fig. 3 on an enlarged scale;

Fig. 5 is a sectional view taken on line 5—5 of Fig. 3;

Fig. 6 is a fragmentary view enlarged similar to a portion of Fig. 3, but showing a modified structure and in an extended condition for full brake application; and Fig. 7 is a view on an enlarged scale taken on line 7—7 of Fig. 6.

Referring first to Figs. 1 and 2, I have shown at 10 an ordinary brake drum such as is commonly used on motor vehicles. Inside this drum is an internal expanding brake ring composed essentially of the opposite shoes 11, 12 and a cam 13 which will be described more in detail. This ring is split at the top and the ends are held in engagement with a fixed anchor 14 by means of the retracting springs 15. Centering and damping devices 18 may be used of any suitable type. An hydraulic cylinder motor 20 engages shoulders on the shoes 11, 12 and operates under hydraulic pressure to spread the shoes apart at their upper end and into engagement with the drum 10. All this may be identical with the structure heretofore in use.

According to my invention, the usual turnbuckle or other adjustable connection between the lower ends of the shoes 11, 12 is replaced by a structure which serves the functions both of adjusting the brake ring and of providing a mechanical operating means for emergency and parking brake use.

In the example illustrated in Figs. 1 and 2, this takes the form of a cam 13 pivoted in the frame links 21, 22, the lower edges of which are fitted to the shoes 11, 12, as shown at 23, and the ends of which are engaged with the shoes by means of the rivets 25 which engages the shoes 11, 12 in the elongated holes 26, thus allowing for circumferential expansion and contraction between the shoes while holding the cam 13 aligned with the ends of the webs of the shoes 11, 12 and holding the assembly in its proper circular relation. The shoes 11 and 12 are held resiliently against the cam 13 by retracting spring 27 secured to an anchoring pin 28 on the frame or backing plate 29.

The ends of the webs of the shoes 11, 12 are rounded off to rather sharp noses, as shown, in order to keep the line of contact with the cam as nearly as possible perpendicular to the radius of the drum and thereby avoid any tendency to rotation of the cam by endwise pressure between the shoes.

Connected to, and advantageously integral with, the cam 13 is an operating lever 30 which extends, as shown, to a point above the level of the axle housing and at this point is secured to the brake operating cable 32 and to a limited stretch bendable link 33, anchored to the axle housing at 35.

The cable 32 is connected in the usual manner to a suitable brake operating lever (not shown) beside the driver's seat of the automobile.

In the use of this device the brakes are installed as shown with slight excess clearance of the cam 13 at its minimum diameter between the rounded ends of the shoes 11, 12. The link 33 is of a length designed to hold the lever 30 at a position corresponding to this minimum diameter contact of the cam 13. The emergency brake mechanism is then operated to pull the lever 30 by means of the cable 32 until the shoes 11 and 12 are in full pressure engagement with the drum 10. The link 33 is designed so that, assuming that there had been an excess clearance, it will stretch beyond its elastic limit by this operation; and, therefore, it takes a permanent set with its new elastic limit at this position of full application of the brakes. When the emergency brake mechanism is released, the link 33 permits only a limited return, short of the original position, by reason of the new permanent set which has been given to it when it was stretched beyond its elastic limit. In this position of limited return, the cam 13 is held tilted to some extent so as to bring a greater diameter between the ends of the shoes 11, 12; and thus the shoes are held at a greater separation and the brake ring is given a greater effective diameter corresponding to the proper operating clearance from the drum 10.

Whenever wear has occurred in the brake shoes 11, 12, an operation of the emergency brake will compress the link 33 beyond its elastic limit, and thus the return of the lever 30 and of the cam 13 will be slightly less than in the preceding operation and the effective diameter of the cam 13 will be thereby increased and the separation of the shoes 11 and 12 will be increased correspondingly, with an effective increase in the diameter of the brake ring.

As the brake lining wears, the lever 30 moves farther and farther in the direction of operation and the cam 13 moves into a more and more oblique position. In such positions, there will be an oblique camming force tending to slide the shoe 11 up over the cam and the cam up over the shoe 12 when the brake ring is put under compression during operation; but this is adequately resisted by the frame links 21, 22, which hold the shoes in their proper aligned position. Because of the rounded ends of the shoes 11, 12 which contact with the cam 13, the line of contact is kept close to the direction of pressure between these parts.

In Figures 3, 4 and 5, I have shown a different embodiment of my invention, but one which operates in a substantially similar manner. In this case, instead of the cam 13, the turnbuckle 13a is provided, which is comprised of the clevis bolts 40 and the central nut 41. The nut 41 has cut into its outer face sockets 42 connected to form a circumferential groove fitted to the links of a sprocket chain 43, connected at one end to the limited resiliency link 33a, which in turn, is secured at its opposite end to the backing plate at 35a. The opposite end of the sprocket chain 43 is connected to the brake operating cable 44, which passes through the backing plate at 46 from whence it is connected by usual linkage with the emergency or parking brake lever (not shown) beside the driver's seat. Pulleys 45 above the nut 41 assure alignment with the groove 42.

The link 33a in the present instance is made in the spiral form of a conventional spring, but unlike an ordinary spring the metal used is chosen to have only a limited elastic stretch and to reach its elastic limit and take a permanent deformation after a predetermined stretch which corresponds to the desired return of the nut 41 for clearance retraction of the brake shoes. The metal should also be one which does not seriously vary in this characteristic as a result of aging or repeated bending or temperature variations to which it will be subjected in use. Metals which have been found satisfactory for this purpose are soft pure aluminum (SO grade) Monel metal hot rolled and annealed. This link used thus to provide a limited equal return from a progressively more advanced limit is not a part of the present invention, but is described and claimed in the prior patent of George S. Lane No. 2,196,396 and in the copending application of George S. Lane Serial No. 393,069, filed May 12, 1941.

In the operation of this device the link 33a is at the outset made shorter than required for normal operation and thus the brake shoes 11a, 12a, have a greater clearance from the drum 10a than is required for normal operation. When the emergency brake linkage is first operated to the extent necessary to force the brake shoes 11a, 12a, into full engagement with the drum 10a, the sprocket chain 43 is pulled around the sprocket groove 42 to such an extent that the link 33a is stretched beyond its elastic limit. When the emergency brake is released, the link returns to a new position more advanced than before; the shoes 11a, 12a, therefore, remain a little farther separated by the turnbuckle 13a than before the operation.

With the arrangement as shown in Figs. 3, 4 and 5, it will be observed that there is the servo-action which tends to make the brake operation more secure as a parking brake. The initial manual operation of the brake by pulling on the cable 44 tends at the same time to rotate the sprocket turnbuckle nut 41 so as to expand the bottom of the shoe and to pull the entire shoe upward so as to bring the toes of the shoes into frictional engagement with the drum. At the end of this manual application the brake ring 11a, 13a and 12a may be raised above its centered position by reason of the upward pull on the sprocket chain 43, as well as being expanded laterally. If the wheels should begin to turn, however, the drag of the shoe 11a or 12a would move it downward away from the anchor 14a while the other shoe would be held by the anchor. Thus the ring composed of the shoes 11a, 12a and the turnbuckle 13a would be moved a little farther toward the bottom of the shoe. This movement in turn would require an additional rotation of the turnbuckle and a consequent expansion of the brake ring, which would serve to prevent further rotation of the wheel.

I have found that the type of chain shown in the drawing composed of folded sheet metal links, is desirable for use in the embodiment illustrated in Figs. 3 to 5 because of its high strength and its ability to bend freely in different directions. The groove 42 in the turnbuckle nut 41 is cut out to fit the links when laid flat around the circumference, whereas the rollers 45, 45' are grooved to receive the chain edgewise. Obviously, however, other types of chain and other flexible driving connections can be used with more or less equivalent results. Likewise, although I have shown in this figure of the drawing a coiled spring type of limited bending link 33a as described above, it will be understood that other forms may be used, e. g., similar to that shown in Fig. 1, and also the various types of ratchets with lost motion connections for readjustment of which Fig. 6 is an example.

Figure 6 shows such a lost-motion ratchet in its fully extended position, i. e., at the point of normal full brake operation. In this figure an ordinary highly resilient spring 33b engages a spring plug 50 of standard design which is secured to the backing plate at 35b. At its other end the spring engages a similar plug 51 which is connected to the chain 43 through the bail 52 and, if desired, a cable 44. Each of the plugs 50, 51 are drilled to receive the check rod 53 which engages the plug 51 with limited lost-motion by reason of its head 54 and shoulder 55. A slit spring washer 56 secured to the face of the plug 50 engages the rod 53 and acts as a "silent ratchet" or "clicker" ratchet, depending upon whether the rod 53 is smooth or threaded, and thus prevents return movement of the rod therethrough while yielding freely to allow a forward adjustment of the rod 53.

Due to this structure, the silent ratchet will be readjusted by any further extension of the device beyond its condition shown in Figure 6, by pulling the rod 53 through the spring washer 56, and thereby to limit the return of the spring by the plug 51 striking the shoulder 55. This will occur whenever, due to wear, the brakes are expanded beyond their previous limits. Otherwise the action of the braking system would be the same as with that shown in Figs. 3 to 5.

From what has been said above, it will be obvious also that the limited return device such as the lost-motion spring may be applied directly to the cam or screw as well as to any part connected to move and be moved therewith; and that lost-motion ratchets may be used between the shoes, to expand the ring, e. g., operated by a lever directly applied to the shoe, and to hold a desired expansion with a limited return to provide the desired clearance between the ring and the drum.

In the embodiments of these Figs. 3 to 5, I find it advantageous to use a relatively short pitch in the screw thread of the turnbuckle so as to reduce the tendency of the turnbuckle nut to rotate under the influence of actual pressure. This, however, requires a greater rotation of the nut for an equivalent adjustment. For this reason the brake operating system should preferably be designed with lever arms of suitable length to give relatively great movement of the operating cable 44. With this greater movement I have found the coil spring form of bending link 33a to be particularly adapted.

What I claim is:

1. In a braking system of the type having a split ring expansible into braking engagement with a brake drum, and a single anchor against which one end of the shoe abuts during brake operation the combination of a plurality of segmental shoes assembled into a split ring, a service brake operating mechanism adapted to engage opposed segments adjacent the anchor and to drive them outwardly into engagement with the drum, an auxiliary brake operating mechanism comprising means for expanding said ring comprising a member adjustable to increase the circumferential spacing of said segments, and a device connected to said member for adjusting it to expand the ring and a limited elasticity retracting spring having its elastic limit at the point corresponding to full pressure engagement of the expansible ring with the drum and having limited elastic return corresponding to normal clearance of the ring from the drum.

2. In a braking system of the type having a split ring expansible into braking engagement with a brake drum, and a single anchor against which one end of the shoe abuts during brake operation the combination of a plurality of segmental shoes assembled into a split ring, a service brake operating mechanism adapted to engage opposed segments adjacent the anchor and to drive them outwardly into engagement with the drum, means for retracting said segments after operation, said retracting means being adapted to maintain the ends of the shoes bearing on said anchor when not in braking operation, an auxiliary brake operating mechanism comprising means for expanding said ring positioned between the ends of adjacent segments at a position in the ring more remote from the anchor than the points of engagement of said service brake mechanism with the shoes, said expanding means comprising a member constituting a part of said ring and adapted to transmit circumferential force between the segmental shoes and adjustable to increase its effective width between said segments and a device connected to said member for adjusting it with a high mechanical advantage to increase its effective width and a limited elasticity retracting spring connected to said device so as to have high mechanical advantage against said adjustable pressure transmitting member, having its elastic limit at the point corresponding to full pressure engagement of the expansible ring with the drum and having limited elastic return corresponding to normal clearance of the ring from the drum.

3. In a braking system of the type having a plurality of brake shoes assembled to form a split ring expansible into engagement with a brake drum, a fixed anchor in the split of said ring adapted to hold the ring against bodily rotation, and service brake operating means for expanding said ring into engagement with the drum, the combination therewith of an auxiliary brake operating means comprising a cam member interposed between the ends of adjacent shoes and adapted by its rotation to expand the ring itno engagement with the drum, means for rotating the cam, and a limited return retracting spring adapted to take a new set upon each movement beyond its previous position of full braking engagement of the ring with the drum, and to have a substantially predetermined limited return from said re-set position whereby said cam is retracted thereby to a predetermined extent providing a desired clearance between the ring and the drum.

4. In a braking system of the type having a plurality of brake shoes assembled to form a split ring expansible into engagement with a brake drum, a fixed anchor in the split of said ring adapted to hold the ring against bodily rotation, and service brake operating means for expanding said ring into engagement with the drum, the combination therewith of an auxiliary brake operating means comprising a cam member interposed between the ends of adjacent shoes and adapted by its rotation to expand the ring into engagement with the drum, means for rotating the cam, and a limited elasticity retracting spring adapted to reach its elastic limit at the position of full braking engagement of the ring with the drum, to take a permanent set if, due to wear, the cam is moved to a position of greater expansion and to have a substantially predetermined limited return from its elastic limit whereby said cam is retracted thereby to a predetermined extent providing a desired clearance between the ring and the drum.

5. In a braking system of the type having a plurality of brake shoes assembled to form a split ring expansible into engagement with a brake drum, a fixed anchor in the split of said ring adapted to hold the ring against bodily rotation, and service brake operating means for expanding said ring into engagement with the drum, the combination therewith of an auxiliary brake operating means comprising a screw threaded member interposed between the ends of adjacent shoes and adapted by its rotation to expand the ring into engagement with the drum, means for rotating the cam, and a limited return retracting spring adapted to take a new set upon each movement beyond its previous position of full braking engagement of the ring with the drum, and to have a substantially predetermined limited return from said re-set position whereby said screw threaded member is retracted thereby to a predetermined extent providing a desired clearance between the ring and the drum.

6. In a braking system of the type having a plurality of brake shoes assembled to form a split ring expansible into engagement with a brake drum, a fixed anchor in the split of said ring adapted to hold the ring against bodily rotation, and service brake operating means for expanding said ring into engagement with the drum, the combination therewith of an auxiliary brake operating means comprising a screw threaded member interposed between the ends of adjacent shoes and adapted by its rotation to expand the ring into engagement with the drum, means for rotating the cam, and a limited elasticity retracting spring adapted to reach its elastic limit at the position of full braking engagement of the ring with the drum, to take a permanent set if, due to wear, the cam is moved to a position of greater expansion and to have a substantially predetermined liimted return from its elastic limit whereby said screw threaded member is retracted thereby to a predetermined extent providing a desired clearance between the ring and the drum.

TRUMAN S. SAFFORD.